No. 721,859. PATENTED MAR. 3, 1903.
H. H. BUFFUM.
AUTOMOBILE STEERING MECHANISM.
APPLICATION FILED JAN. 23, 1903.
NO MODEL. 2 SHEETS—SHEET 1.
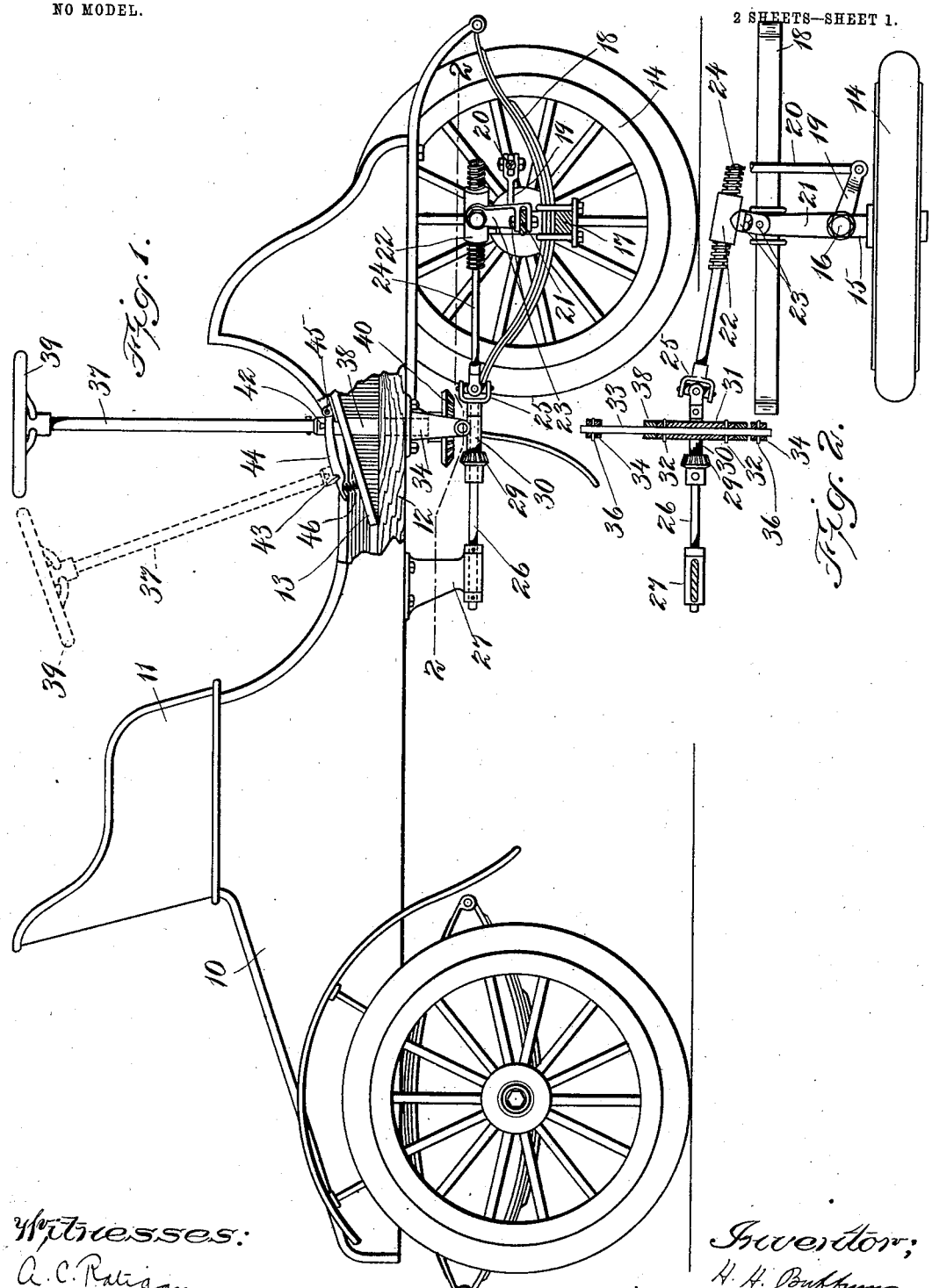
Witnesses:
A. C. Ratigan
Walter P. Abell
Inventor:
H. H. Buffum
by Wright, Brown & Quinby
Attys

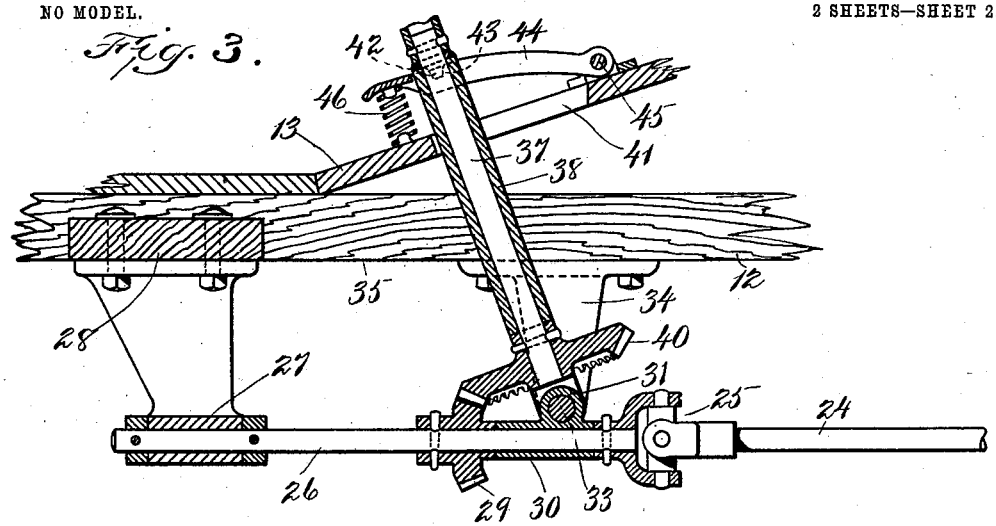
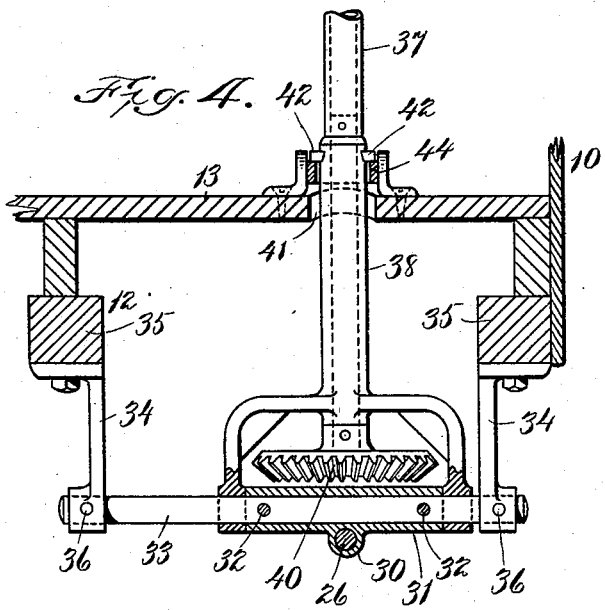

UNITED STATES PATENT OFFICE.

HERBERT H. BUFFUM, OF ABINGTON, MASSACHUSETTS.

AUTOMOBILE STEERING MECHANISM.

SPECIFICATION forming part of Letters Patent No. 721,859, dated March 3, 1903.

Application filed January 23, 1903. Serial No. 140,235. (No model.)

*To all whom it may concern:*

Be it known that I, HERBERT H. BUFFUM, of Abington, in the county of Plymouth and State of Massachusetts, have invented certain new and useful Improvements in Automobile Steering Mechanisms, of which the following is a specification.

This invention relates to the steering apparatus of vehicles, such as automobiles; and its object is to improve and simplify the steering mechanism described in a copending application filed by me January 2, 1903, Serial No. 137,421. Certain features of construction herein shown are not broadly claimed in the present application, as they are embodied in the aforesaid copending application.

Of the accompanying drawings, Figure 1 represents a side elevation, partly in section, of a motor-vehicle provided with a steering apparatus embodying my invention. Fig. 2 represents a section on line 2 2 of Fig. 1. Fig. 3 represents an enlarged longitudinal vertical section showing the lower end of the steering-pillar and connections. Fig. 4 represents a transverse vertical section of said parts looking forward.

The same reference characters indicate the same parts in all the figures.

In the drawings, 10 is the vehicle-body, having a seat 11, frame 12, and flooring 13.

14 represents the steering ground-wheels, mounted upon swinging journals or knuckles 15, pivoted at 16 to a dead axle 17, which is yieldingly connected by springs 18 to the body 10, said knuckles having the usual arms 19, connected by a cross-link 20. One of the knuckles also has an arm 21.

22 is a nut connected by a universal joint 23 with the end of the arm 21 and occupied by the threaded end of a rotary screw-rod 24. The latter is connected by a universal joint 25 with a horizontal longitudinal shaft 26, stationarily mounted on the body 10 and having an end-thrust bearing 27 on a cross-sill 28 of the framing 12. The shaft 26 is provided with a bevel-pinion 29, forward of which it has support in a bearing 30, formed on a transverse sleeve 31. The latter is rigidly attached by pins 32 32 to a shaft 33, hung in brackets 34 34 on longitudinal sills 35 of the framing and rigidly secured in said brackets by pins 36 36.

37 is the steering-pillar, having support at its lower end in a Y-shaped bearing 38, whose arms are journaled on the fixed shaft 33 at opposite ends of the sleeve 31. At its upper end the pillar 37 carries a hand-wheel 39, and at its lower end is fixed a bevel-gear 40, adapted to mesh with the bevel-pinion 29. The stem of bearing 38 projects through an elongated solt 41 in the flooring 13 and above said flooring is provided with lugs 42 42, adapted to reside in notches 43 in a U-shaped foot-catch 44. The latter is pivoted at 45 to a bracket on the flooring 13, and its rear end is yieldingly elevated by a spring 46.

In its operative position (indicated in Fig. 3 and by dotted lines in Fig. 1) the steering-pillar 37 is rearwardly inclined, so as to be in a convenient position for operation by the steersman sitting in the vehicle-seat 11. When thus positioned, the bearing of the pillar is locked by the foot-catch 44, and the gears 29 40 are thrown into mesh, so that the rotary movement of the pillar is transmitted through the gears to the shafts 26 and 24. Such rotation causes the nut 22 to travel on the screw-shaft 24 and imparts the steering movement to the ground-wheels 14. When the seat is to be entered or left by the operator, he may depress the catch 44 and throw the pillar 37 toward a vertical position, as represented by full lines in Fig. 1, which movement results in throwing the gear 40 out of mesh with gear 19. It will be seen, therefore, that the gears 29 40 in addition to their function as transmitters of rotary motion also act as complemental toothed coupling members, whereby the steering-pillar is thrown into and out of operative relation with the stationarily-mounted steering connections 24 26, &c.

I claim—

1. In a vehicle steering mechanism a swinging ground-wheel, rotary steering mechanism connected therewith, a swinging rotary steersman's pillar, and toothed gears connecting said pillar and mechanism and thrown into and out of mesh by swinging movement of said pillar.

2. In a vehicle steering mechanism, a swinging ground-wheel, rotary steering mechanism connected therewith, a swinging rotary steersman's pillar, toothed gears connecting said pillar and mechanism and thrown into and out of mesh by swinging movement of said pillar, and means to lock said pillar in its gear-meshing position.

3. In a vehicle steering mechanism, a vehicle-body, a swinging ground-wheel, a rotary shaft longitudinally mounted on said body and geared with said ground-wheel, a swinging steering-pillar mounted on the body and normally having a rearwardly-inclined position, and bevel-gears on said shaft and pillar respectively thrown into and out of mesh by the backward-and-forward swinging movement of said pillar.

4. In a vehicle steering mechanism, a vehicle-body, a swinging ground-wheel, a rotary shaft longitudinally mounted on said body and geared with said ground-wheel, a swinging steering-pillar mounted on the body and normally having a rearwardly-inclined position, bevel-gears on said shaft and pillar respectively thrown into and out of mesh by the backward-and-forward swinging movement of said pillar, and a foot-operated catch on the body to lock said pillar in its rearwardly-inclined position.

5. In a vehicle steering mechanism, a vehicle-body, a swinging ground-wheel, a rotary shaft longitudinally mounted on said body and geared with said ground-wheel, brackets mounted on the body-framing, a transverse shaft fixed in said brackets, a bearing for said longitudinal shaft fixed to the transverse shaft, a steersman's pillar, a Y-shaped bearing for said pillar mounted to swing on said transverse shaft, and bevel-gears connecting said pillar and said longitudinal shaft.

In testimony whereof I have affixed my signature in presence of two witnesses.

HERBERT H. BUFFUM.

Witnesses:
R. M. PIERSON,
W. E. BATES.